(Model.)
E. D. PINNEY & G. W. DAILY.
Horse Collar.
No. 235,567. Patented Dec. 14, 1880.
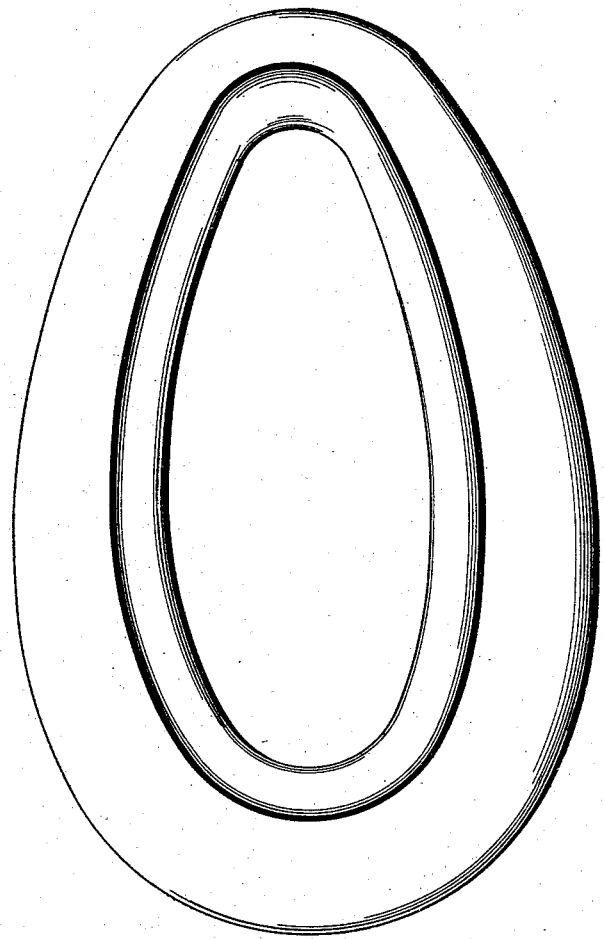
WITNESSES
INVENTOR
ATTORNEY

UNITED STATES PATENT OFFICE.

EMERSON D. PINNEY AND GEORGE W. DAILY, OF AURORA, ILLINOIS.

HORSE-COLLAR.

SPECIFICATION forming part of Letters Patent No. 235,567, dated December 14, 1880.

Application filed June 11, 1880. (Model.)

*To all whom it may concern:*

Be it known that we, EMERSON D. PINNEY and GEORGE W. DAILY, of Aurora, in the county of Kane and State of Illinois, have invented certain new and useful Improvements in Horse-Collars; and we do hereby declare the following to be a full, clear, and exact description of the invention, such as will enable others skilled in the art to which it appertains to make and use the same, reference being had to the accompanying drawing, and to letters of reference marked thereon, which form a part of this specification.

Our invention relates to an improvement in horse-collars, the object being to produce a horse-collar which will be light and durable in its construction, of small cost in manufacture, and one which will be practically a non-conductor of heat and cold and not injuriously affected by water.

With these ends in view our invention consists in a horse-collar formed of paper-pulp compressed into the desired form.

The accompanying drawing illustrates one form of horse-collar embodying our invention.

The collar is formed of pulp, consisting of rag pulp, or pulp formed of wood or other vegetable fiber, or a composition of different kinds of pulp, mixed with flour, paste, or other adhesive substance, which composition is thoroughly mixed together and compressed into the desired form of horse-collar. The surface may be coated with shellac and lamp-black, to constitute a water-proof surface, or the shellac and lamp-black may be mixed with the pulp in the process of forming the article. Instead of using shellac and lamp-black, any suitable waterproofing compound may be used.

The horse-collar may be constructed of the form shown in the drawing, or it may be left open at the tip or bottom, or at both ends.

The collar constructed in accordance with our invention is of much less first cost than leather or metal, is of greater durability than leather, and practically as durable as metal. Further, owing to its lightness and to the material employed, it is rendered easy upon the neck of the animal. It is superior to metal collars in that the paper-pulp is practically a non-conductor of heat and cold, and hence no injurious effects result to the animal by its use in either hot or cold weather.

It is evident that the proportions and composition may be varied slightly without departing from the spirit of our invention, and hence we do not limit ourselves to any precise proportion or composition of ingredients or to any particular form of collar; but Having fully described our invention, what we claim as new, and desire to secure by Letters Patent, is—

A horse-collar made of paper-pulp, substantially as set forth.

In testimony that we claim the foregoing we have hereunto set our hands this 2d day of June, 1880.

EMERSON D. PINNEY.
    GEORGE W. DAILY.

Witnesses:
 CHAS. LOUCK,
 ROSWELL W. GATES.